US009094602B2

(12) United States Patent
Kunugi et al.

(10) Patent No.: US 9,094,602 B2
(45) Date of Patent: Jul. 28, 2015

(54) IMAGING DEVICE AND FOCUS DETECTION METHOD

(71) Applicants: Olympus Corporation, Shibuya-ku, Tokyo (JP); Olympus Imaging Corp., Shibuya-ku, Tokyo (JP)

(72) Inventors: Kazumasa Kunugi, Hachioji (JP); Yoshinobu Omata, Hachioji (JP); Yukie Yamazaki, Hino (JP); Tetsuo Kikuchi, Hachioji (JP)

(73) Assignees: Olympus Corporation, Tokyo (JP); Olympus Imaging Corp., Tokyo (JP)

( * ) Notice: Subject to any disclaimer, the term of this patent is extended or adjusted under 35 U.S.C. 154(b) by 0 days.

(21) Appl. No.: 14/157,222

(22) Filed: Jan. 16, 2014

(65) Prior Publication Data
US 2014/0198245 A1    Jul. 17, 2014

(30) Foreign Application Priority Data

Jan. 17, 2013   (JP) ................................ 2013-006734

(51) Int. Cl.
*H04N 5/232*   (2006.01)
*H04N 5/369*   (2011.01)

(52) U.S. Cl.
CPC ....... *H04N 5/23212* (2013.01); *H04N 5/23209* (2013.01); *H04N 5/3696* (2013.01)

(58) Field of Classification Search
CPC .......... H04N 5/23209; H04N 5/23212; H04N 5/3696
See application file for complete search history.

(56) References Cited

U.S. PATENT DOCUMENTS

| 5,760,896 A * | 6/1998 | Suzuki ........................ 356/3.08 |
| 6,930,297 B1 | 8/2005 | Nakamura |
| 2011/0199506 A1 * | 8/2011 | Takamiya .................. 348/222.1 |

FOREIGN PATENT DOCUMENTS

JP    2007-256885    10/2007

* cited by examiner

*Primary Examiner* — Daniel M Pasiewicz
(74) *Attorney, Agent, or Firm* — John C. Pokotyo; Straub & Pokotylo

(57) ABSTRACT

An imaging device of the present invention comprises a focus detection section using phase difference detection based on output of the focus detection pixels, a pixel adding section, for creating respective first addition outputs by adding outputs of a first number of focus detection pixels, and creating respective second addition outputs by dividing the first number of arrays into a plurality, and adding outputs of focus detection pixels of the divided array, and a determination section for determining whether or not to correct an angle error, wherein the focus detection section executes a focus detection operation on the basis of the first addition outputs, the determination section determines whether or not to correct angle error on the basis of the plurality of second addition outputs, and in the event that the determination section has determined to correct angle error, the focus detection section corrects angle error based on a result of a focus detection operation.

16 Claims, 11 Drawing Sheets

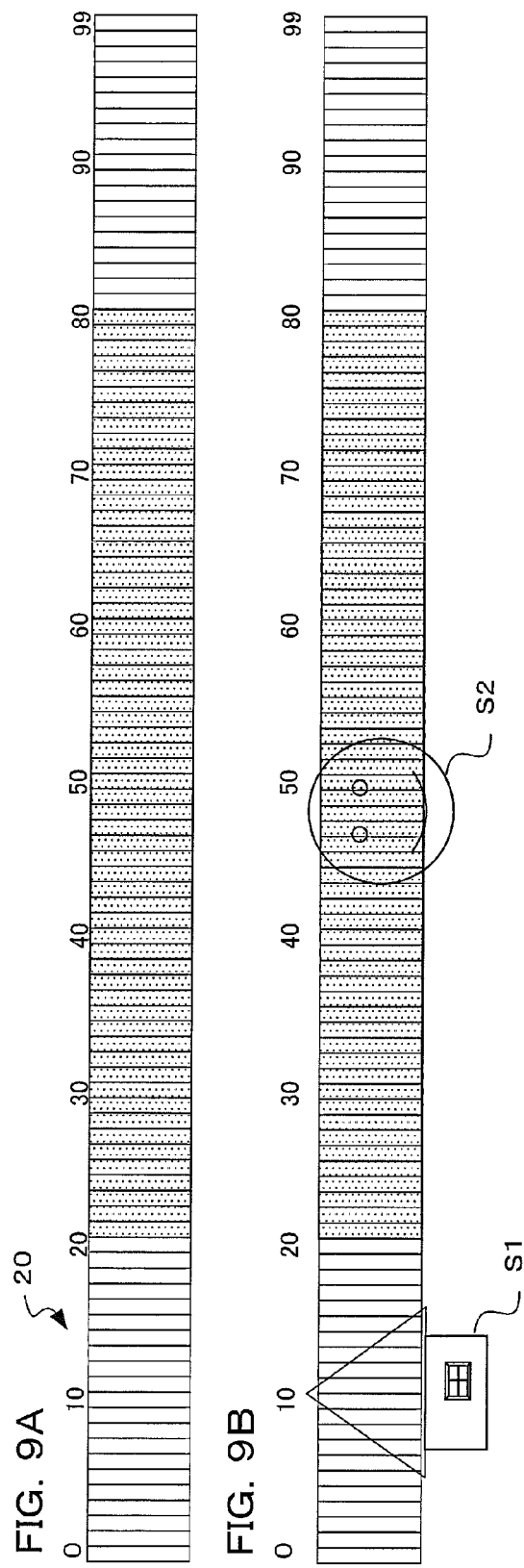

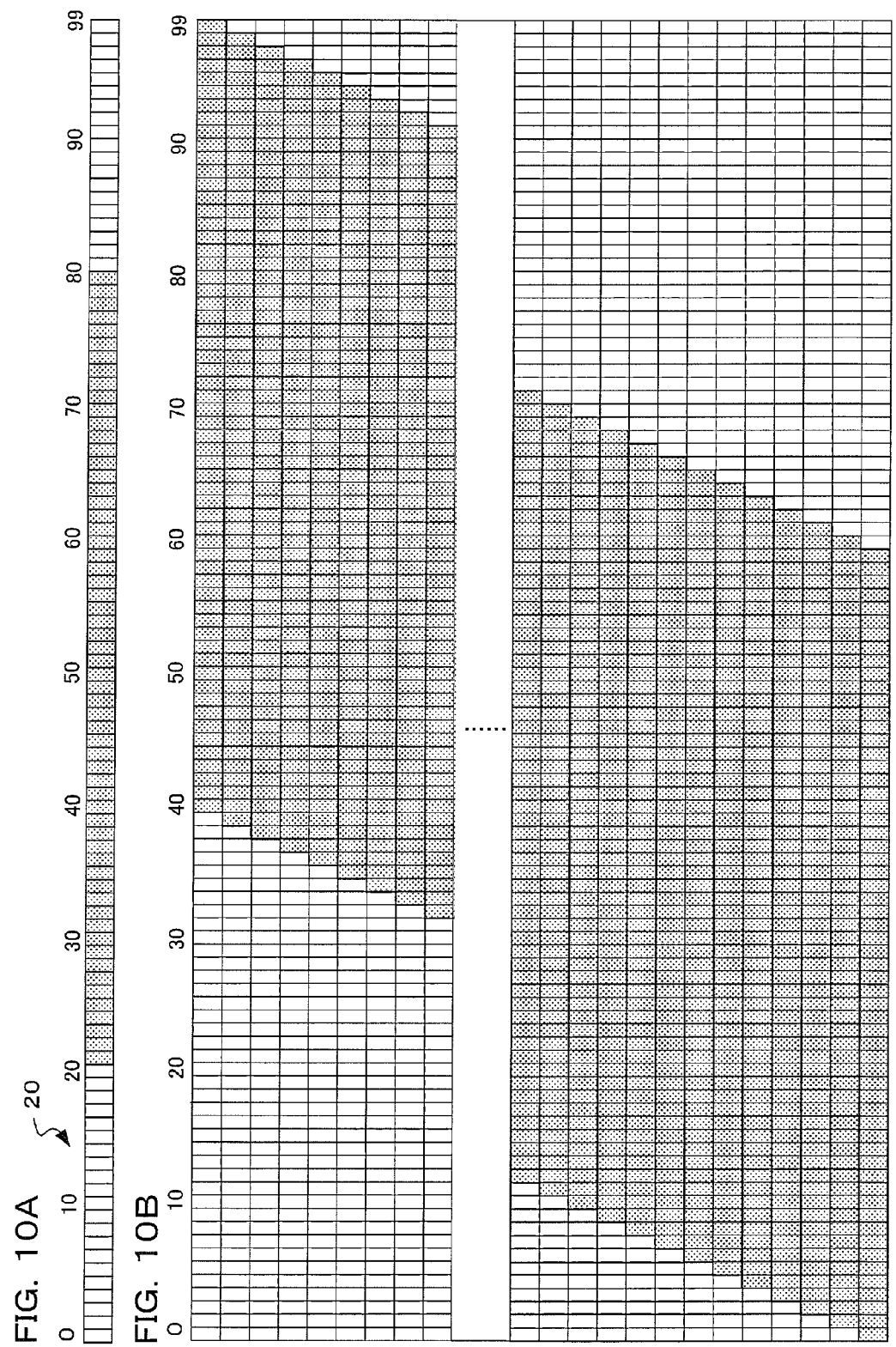

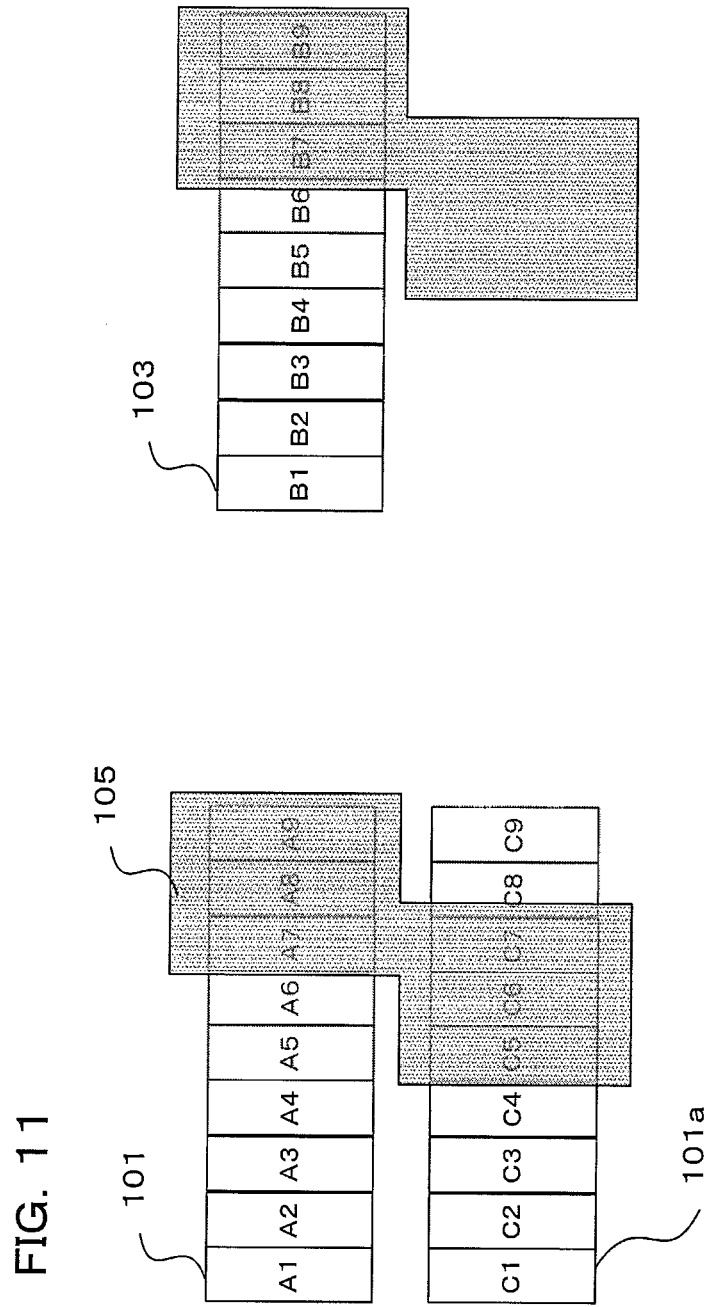

IMAGING DEVICE AND FOCUS DETECTION METHOD

Benefit is claimed, under 35 U.S.C. §119, to the filing date of prior Japanese Patent Application No. 2013-006734 filed on Jan. 17, 2013. This application is expressly incorporated herein by reference. The scope of the present invention is not limited to any requirements of the specific embodiments described in the application.

BACKGROUND OF THE INVENTION

1. Field of the Invention

The present invention relates to an imaging device for carrying out phase difference focus detection, and in particular relates to an imaging device and control method for an imaging device capable of focus detection with good accuracy, even for a subject that is at an angle with respect to a phase difference detection direction.

2. Description of the Related Art

An imaging device provided with an image sensor having a part thereof that also doubles as a phase difference method focus detection element is conventionally known (for example, Japanese patent application No. 4853071). With this image sensor, generally, pixel data of a focus detection element in a direction perpendicular to an out of focus direction (also called ranging direction or phase difference direction), is added, and an out of focus amount (also called defocus amount) is calculated using this added pixel data.

Also, at the time of phase difference method focus detection, if an angle formed by an optical system and a sensor system is inclined, it results in a ranging error, and so a ranging device to correct this angle has been proposed (Japanese patent laid-open No. 2000-206403). With the ranging device disclosed in this patent publication 2, a distance is detected based on output from a first sensor row 101 and a second sensor row 103 that is arranged at a position separate by a base-line length, as shown in FIG. 11. Also, a third sensor row 101*a* is arranged parallel with the first sensor row 101, and an angle formed by the optical system and the sensor system is calculated based on output from the first, second and third sensor rows.

SUMMARY OF THE INVENTION

An object of the present invention is to provide an imaging device and focus detection method capable of accurate ranging, in phase difference AF, even in a case where a subject is slanted with respect to a phase difference detection direction.

An imaging device of the present invention, having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprises: a focus detection section for detecting an out of focus amount and an out of focus direction by carrying out a focus detection operation using phase difference detection based on output of the focus detection pixels; a pixel adding section, for creating respective first addition outputs by adding outputs of a first number of focus detection pixels that are arranged in a direction that is perpendicular to the phase difference detection direction, for a plurality of regions arranged in the detection direction for phase difference detection of an imaging region of the image sensor, and creating respective second addition outputs in a direction that is perpendicular to the phase difference detection direction by adding outputs of a second number of focus detection pixels that is smaller than the first number, arranged in a direction perpendicular to the phase difference detection direction, for a plurality of regions arranged in the detection direction for phase difference detection, and a determination section for determining whether or not to correct an angle error arising as a result of inclination of an optical image with respect to the pixel array direction, wherein the focus detection section executes a focus detection operation on the basis of the first addition outputs corresponding to the plurality of regions, the determination section determines whether or not to correct angle error on the basis of the plurality of second addition outputs corresponding to the plurality of regions, and in the event that the determination section has determined to correct angle error, the focus detection section corrects angle error based on a result of a focus detection operation.

An imaging device of the present invention, having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprises a focus detection section for detecting an out of focus amount and an out of focus direction by carrying out a focus detection operation using phase difference detection based on output of the focus detection pixels, a pixel adding section, for creating respective first addition outputs by adding outputs of a first number of focus detection pixels that are arranged in a direction that is perpendicular to a detection direction for the phase difference detection, for a plurality of regions arranged in the phase difference detection direction of an imaging region of the image sensor, and creating respective second addition outputs in a direction that is perpendicular to the phase difference detection direction by dividing the first number of arrays, that are arrayed in a direction perpendicular to the phase difference detection direction, into a plurality, and adding outputs of focus detection pixels of the divided array, for a plurality of regions arranged in the detection direction for phase difference detection, and a determination section for determining whether or not to correct an angle error arising as a result of inclination of an optical image with respect to the pixel array direction, wherein the focus detection section executes a focus detection operation on the basis of the first addition outputs corresponding to the plurality of regions, the determination section determines whether or not to correct angle error on the basis of the plurality of second addition outputs corresponding to the plurality of regions, and in the event that the determination section has determined to correct angle error, the focus detection section corrects angle error based on a result of a focus detection operation.

A focus detection method of the present invention, for controlling a focus detection operation of an imaging device having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprises detecting an out of focus amount and an out of focus direction by carrying out a focus detection operation using phase difference detection based on output of the focus detection pixels, creating respective first addition outputs by adding outputs of a first number of focus detection pixels that are arranged in a direction that is perpendicular to a detection direction for the phase difference detection, for a plurality of regions arranged in the detection direction for phase difference detection of an imaging region of the image sensor, and creating respective second addition outputs in a direction that is perpendicular to the phase difference detection direction by adding outputs of a second number of focus detection pixels that is smaller than the first number, arranged in a direction perpendicular to the phase difference detection direction, for a plurality of regions arranged in the detection direction for phase difference detection, executing a focus detection operation on the basis of the first addition outputs corresponding to the plurality of regions, and determining whether or not to correct angle error, arising as a result of inclination of an optical image with respect to the pixel array direction, on the basis of the plurality of second addition outputs corresponding to the plurality of regions, and, in the event that it has been determined to correct angle error, correcting angle error based on a result of the focus detection operation.

A focus detection method of the present invention, for an imaging device having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprises detecting an out of focus amount and an out of focus direction by carrying out a focus detection operation using phase difference detection based on output of the focus detection pixels, creating respective first addition outputs by adding outputs of a first number of focus detection pixels that are arranged in a direction that is perpendicular to a detection direction for the phase difference detection, for a plurality of regions arranged in the phase difference detection direction of an imaging region of the image sensor, and creating respective second addition outputs in a direction that is perpendicular to the phase difference detection direction by dividing the first number of arrays, that are arrayed in a direction perpendicular to the phase difference detection direction, into a plurality, and adding outputs of the divided array of focus detection pixels, for a plurality of regions arranged in the detection direction for phase difference detection, executing a focus detection operation on the basis of the first addition outputs corresponding to the plurality of regions, determining whether or not to correct angle error, arising as a result of inclination of an optical image with respect to the pixel array direction, on the basis of the plurality of second addition outputs corresponding to the plurality of regions, and, in the event that it has been determined to correct angle error, correcting angle error based on a result of the focus detection operation.

BRIEF DESCRIPTION OF THE DRAWINGS

FIG. 4 is a plan diagram showing the structure of an image sensor of a camera of one embodiment of the present invention.

FIG. 6 is a plan diagram showing the structure of an image sensor of a camera of one embodiment of the present invention.

FIG. 9A and FIG. 9B are drawings for explaining a scanning range of the image sensor, in the camera of one embodiment of the present invention.

FIG. 10A and FIG. 10B are drawings for explaining a scanning range of the image sensor, in the camera of one embodiment of the present invention.

FIG. 11 is a drawing for explaining a conventional ranging device.

DETAILED DESCRIPTION OF THE PREFERRED EMBODIMENTS

Figure 1:
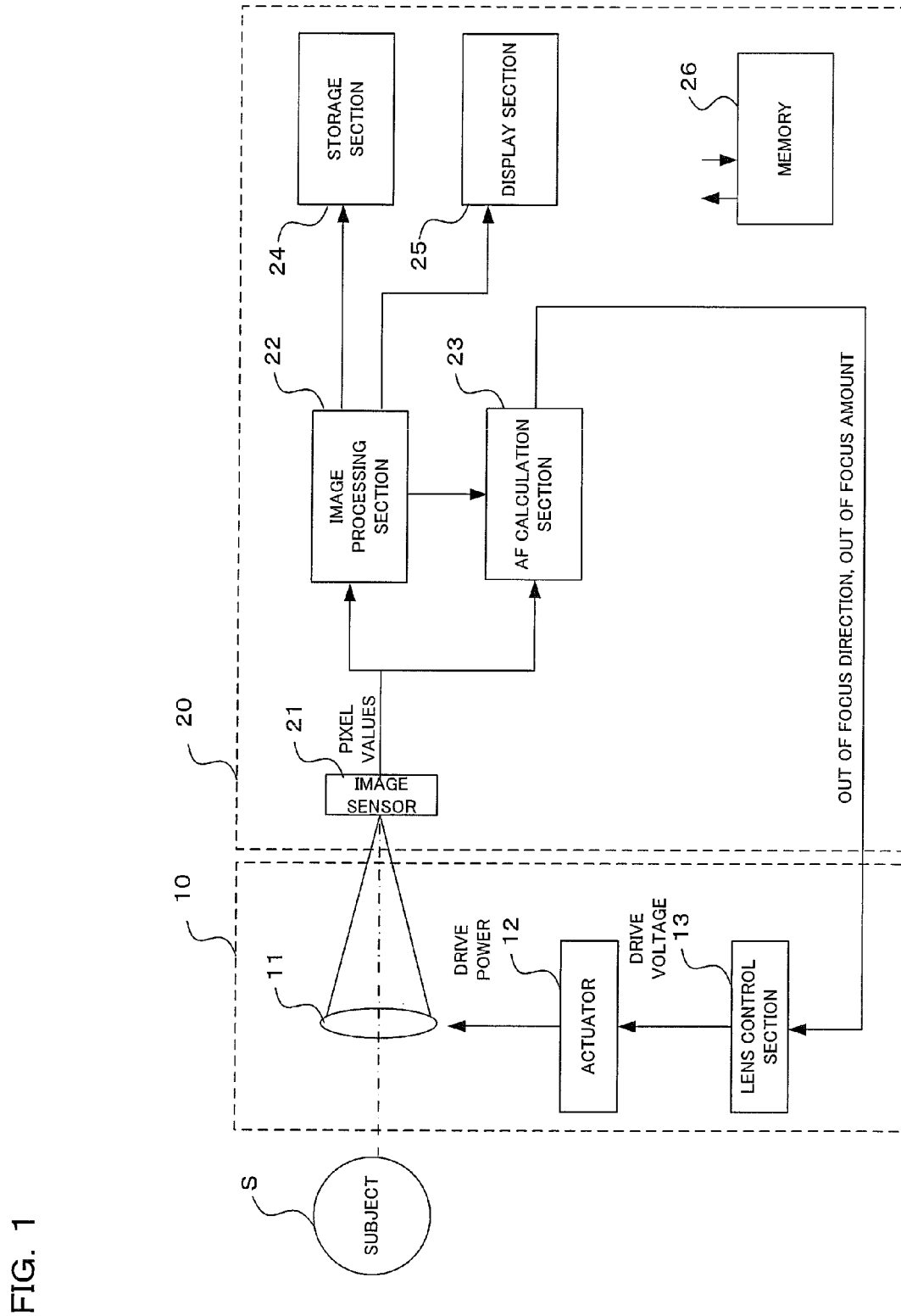
FIG. 1 is a block diagram mainly showing the electrical structure of a camera of one embodiment of the present invention.

Preferred embodiments using a digital camera (abbreviated to camera) to which the present invention has been applied will be described in the following in accordance with the drawings. FIG. 1 is a block diagram mainly showing the electrical structure of a camera of one embodiment of the present invention. The camera relating to this embodiment comprises an interchangeable lens barrel 10 and a camera body 20. With this embodiment, the interchangeable lens barrel 10 and a camera body 20 are configured separately, but they may also be constructed integrally, like a general compact camera.

A photographing lens 11 is arranged inside the interchangeable lens barrel 10. The photographing lens 11 is constituted by a plurality of optical lenses for forming an optical image of a subject S. An actuator 12 and a lens control section 13 are also arranged inside the interchangeable lens barrel 10. The lens control section 13 receives out of focus direction and out of focus amount from an AF calculation section 23 inside the camera body 20, and carries out control of the actuator 12 based on these items of information. The actuator 12 moves the photographing lens 11 in the optical axis direction to carry out focusing.

An image sensor 21, image processing section 22, AF calculation section 23, storage section 24 and display section 25 are provided within the camera body 20.

The image sensor 21 is arranged on the optical axis of the photographing lens 11, close to a position where a subject image is formed. The image sensor 21 is provided with a plurality of pixels that have a photoelectric conversion section for converting the subject image (optical image) to an electrical signal. Specifically, the image sensor 21 has photodiodes that constitute each pixel arranged two-dimensionally in a matrix shape, each photodiode generates photoelectric conversion current in accordance with received light amount, and this photoelectric conversion current is the subject of charge storage by a capacitor connected to each photodiode. A Bayer array RGB filter is arranged on the front surface of each pixel. The plurality of photodiodes correspond to the plurality of pixels described above.

Also, the plurality of pixels of the image sensor 21 include phase difference AF detection pixels (hereafter referred to as "focus detection pixels") 21a configured so as to restrict the incident direction of light flux incident on the pixels, and imaging pixels 21R, 21G and 21B configured so as to restrict the light flux incident on the pixels less than the focus detection pixels. The image sensor 21 outputs pixel values that have been output from the focus detection pixels and the imaging pixels to the image processing section 22 and the AF calculation section 23. Arrangement of the focus detection pixels 21a and the imaging pixels 21R, 21G and 21B of the image sensor 21 will be described later using FIG. 2 to FIG. 6.

The image processing section 22 is input with pixel values from the imaging pixels 21R, 21G and 21B, among the pixel values, and carries out image processing for a live view display image and a storage image. The image processing section 22 also outputs image data that has been processed for storage to the storage section 24, and outputs image data that has been subjected to image processing for live view display to the display section 25. The storage section 24 is an electrically rewritable non-volatile memory, to which image data for storage is input and stored. Also, the image processing section 22 has a control element, such as a CPU (Central processing unit), and causes operation of each section within the camera as well as carrying out control of the camera.

The display section 25 is input with image data for live view display or image data for playback, and carries out display of a live view image or a playback image on a display panel such as an LCD or organic EL, based on the image data. A memory 26 is an electrically rewritable non-volatile memory, such as flash memory, and stores adjustment values for within the camera, and programs for camera control etc.

The AF calculation section 23 is input with pixel values from the focus detection pixels, among the pixel values, and calculates out of focus direction and out of focus amount using a phase difference AF method. At the time of AF calculation, a first addition output is created by adding outputs of focus detection pixels that are arranged in a direction perpendicular to the out of focus direction, and the out of focus amount is calculated based on this first addition output. Also, within the output of the focus detection pixels that are arranged in a direction perpendicular to the out of focus direction, a second addition output is created with a number of pixels that is fewer than the focus detection pixels that were used with the first addition output, and determination of angle error for the optical image is based on the second addition output. If the result of this determination is that there is angle error, correction of out of focus amount is carried out. This angle error detection will be described later using FIG. 7.

The AF calculation section 23 functions as a focus detection section for detecting an out of focus amount and an out of focus direction by carrying out a focus detection operation based on output of the focus detection pixels. The AF calculation section 23 also functions as a pixel addition section, for creating addition output by adding outputs of focus detection pixels 21a that are arrayed in a direction perpendicular to an out of focus direction, for specified regions of an imaging regions of the image sensor 21. (Refer to FIG. 3 and S3 and S9 of FIG. 7, which will be described later.)

Figure 7:
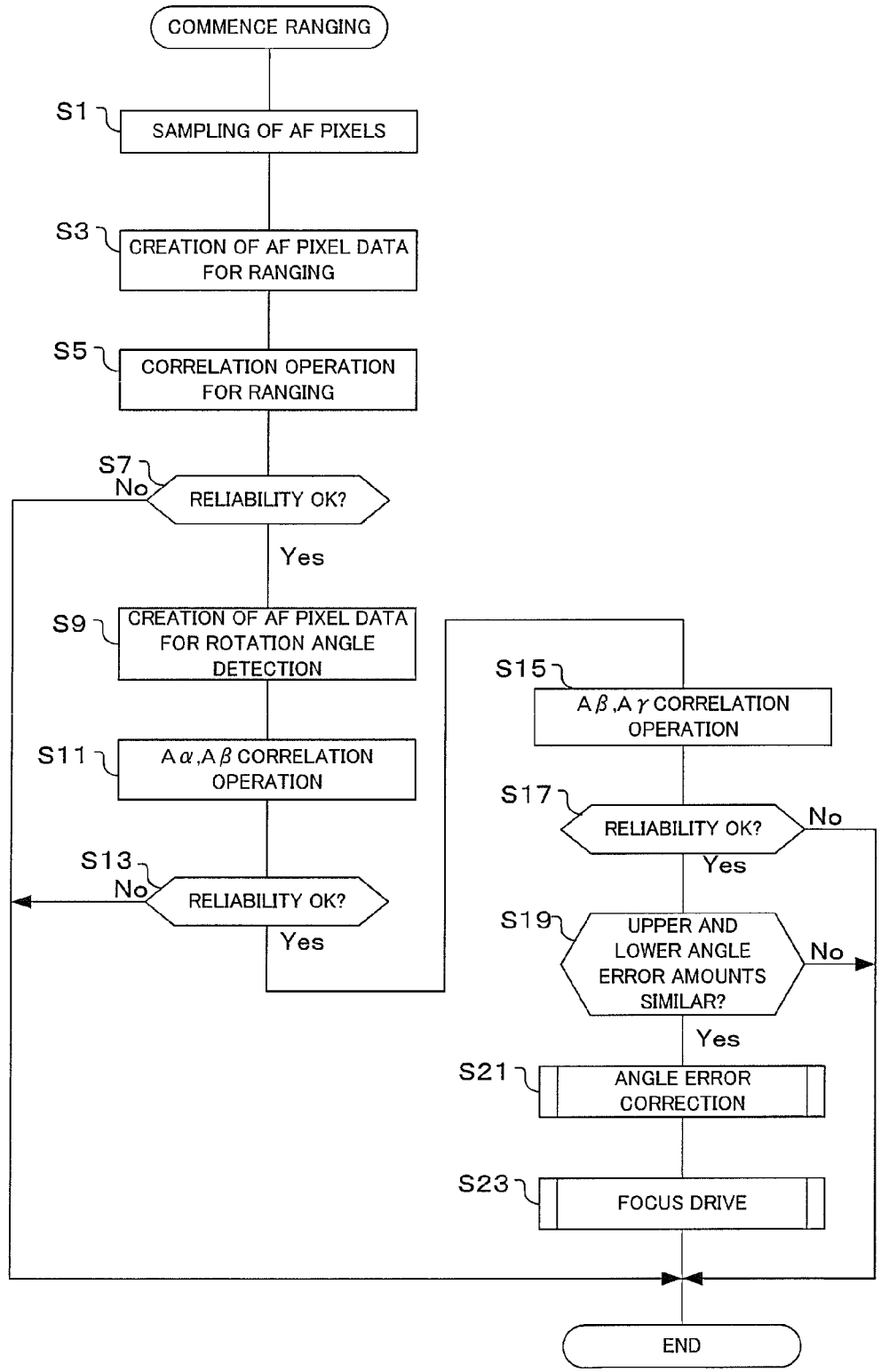
FIG. 7 is a flowchart showing operation of the camera of one embodiment of the present invention.

The AF calculation section 23 further functions as a determination section for determining whether or not to correct an angle error arising as a result of inclination of an optical image with respect to the pixel array direction (refer to S13 and S17 of FIG. 7, which will be described later). The above-described focus detection section executes a focus detection operation based on the first addition output, while the determination section determines whether or not to correct angle error on the basis of the plurality of second addition outputs, and if the determination section determines to correct the angle error, the angle error is corrected for the result of the focus detection operation.

Figure 2:
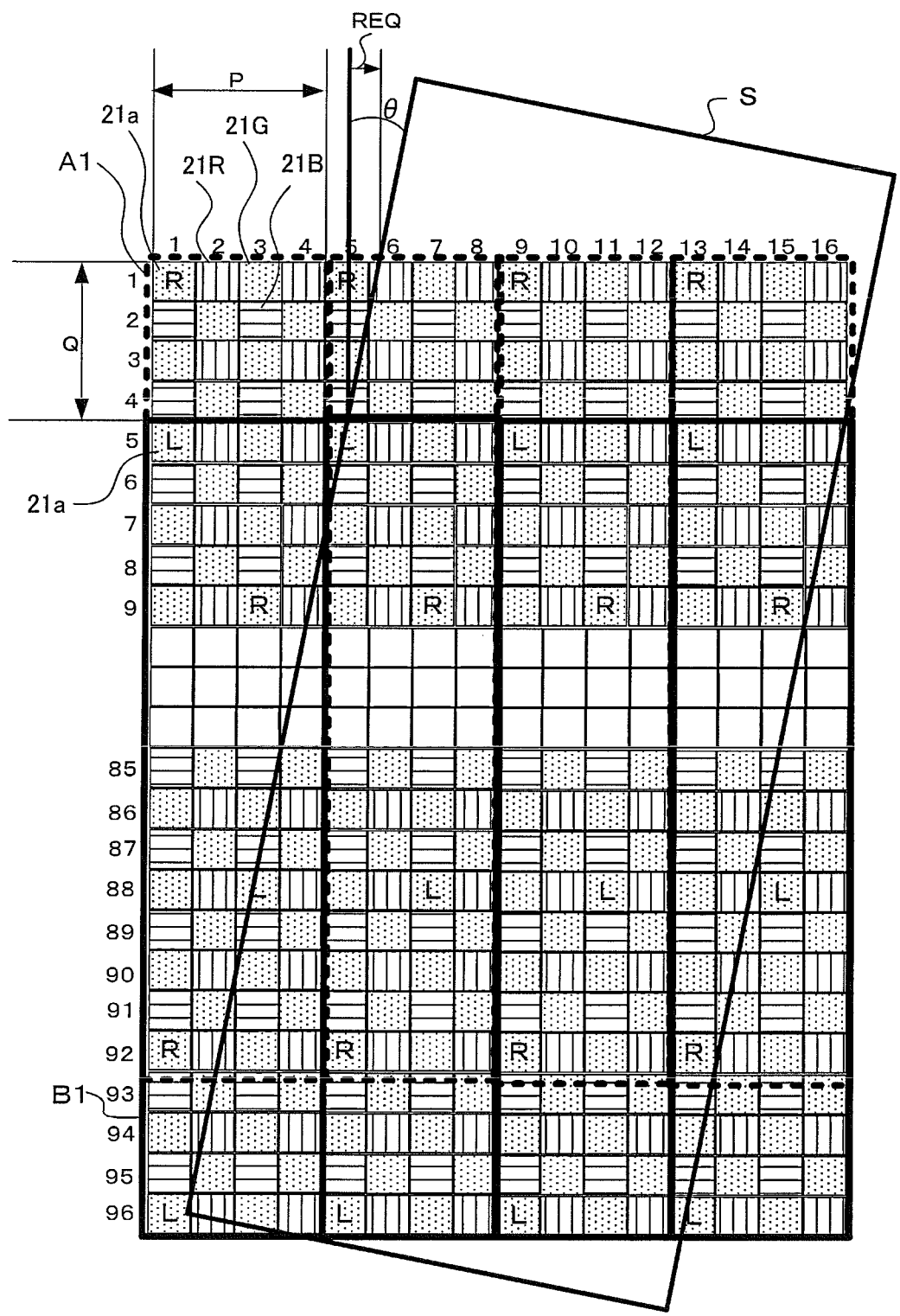
FIG. 2 is a plan diagram showing the structure of part of an image sensor of a camera of one embodiment of the present invention.

Next, the structure of the image sensor 21 of this embodiment will be described using FIG. 2. A plurality of focus detection pixels 21a and a plurality of imaging pixels 21R, 21G and 21B are arranged on the imaging surface of the image sensor 21, as shown in FIG. 2. As described above, a Bayer array RGB filter is arranged on the front surface of the imaging pixels 21R, 21G and 21B. Green (G) filters (assigned a dotted pattern in FIG. 2) are provided on the front surfaces of the imaging pixels 21G, red (R) filters (assigned vertical stripes in FIG. 2) are provided on the front surfaces of the imaging pixels 21R, and blue (B) filters (assigned horizontal stripes in FIG. 2) are provided on the front surfaces of the imaging pixels 21B.

Also, the focus detection pixels 21a are provided with opening sections stirs to restrict the incident direction of light flux that is incident on the pixels. In the drawing, the focus detection pixels 21a that are designated "R" receive light flux that is incident from the right side, and right openings are provided so as to restrict light flux that is incident from the left side (in the following this may be abbreviated to R pixels). Also, the focus detection pixels 21a that are designated "L" receive light flux that is incident from the left side, and left openings are provided so as to restrict light flux that is incident from the right side (in the following this may be abbreviated to L pixels). Here, the right side and the left side are the right side and the left side along the phase difference detection direction, when carrying out a focus detection operation using a phase difference AF method.

Next, angle error correction with the pixel arrangement of the image sensor 21 such as shown in FIG. 2 will be described. With the image sensor 21, since R pixel values and L pixel values are added along a row direction, and calculation of out of focus amount using a phase difference AF method is carried out using R pixel added values and L pixel added values for every row (to be precise, as will be described later, a plurality of rows are collected together as an area and addition is performed in a row direction within an area), with this embodiment the phase difference detection direction is the horizontal direction in FIG. 2. As a subject S, as shown in FIG. 2, a case is assumed where the subject is inclined at a subject angle θ from a direction that is perpendicular to the phase difference detection direction.

With the example shown in FIG. 2, the R pixels and the L pixels are offset by 4 pixels. In the case of projecting an inclined subject S onto the focus detection pixels 21a, an error is caused in a ranging result, to an extent of this 4-pixel offset. An angle error amount REQ at this time can be calculated from equation (1) below.

$$\text{angle error amount } REQ = \tan \theta \times Q/P \tag{1}$$

Here,
Q: amount of RL pixel offset
P: AF pixel pitch

With the example shown in FIG. 2, the RL pixel offset amount is 4 pixels, and the AF pixel pitch is 4 pixels, and so Q/P=4/4=1. AF pixels represent virtual pixels, which will be described later, and the AF pixel pitch represents the pitch of the virtual pixels. Also, the angle error amount REQ is expressed in units of AF pixel pitch.

If angle error amount REQ has been calculated, it is possible to carry out angle error correction by subtracting angle error amount REQ from a ranging result (out of focus amount obtained using a phase difference AF method).

Next, an addition method for focus detection pixels at the time of ranging (out of focus amount calculation) and an addition method for focus detection pixels at the time of angle error detection will be described using FIG. 3. FIG. 3A is a drawing with regions having a specified range divided to include focus detection pixels of the image sensor 21 used at the time of ranging, arranged in a pixel row shape. As will be described later, pixel rows shape segmentation is in order to handle pixel addition values obtained by adding pixel values of the focus detection pixels included within that segment. Here, in order to make the description easy to understand, in the description that follows the pixel row shaped segmentation will be called virtual pixels, and the arrangement of the segments will be called virtual pixel rows. FIG. 3A shows a case where an inclined subject S has been projected, with virtual pixels A1-A9 being a standard pixel row, and virtual pixels B1-B9 being a reference pixel row. In FIG. 2, in the case where the R pixel row has been made the standard pixel row A1-A9 of virtual pixels, the L pixel row becomes the reference pixel row B1-B9 of virtual pixels. The standard pixel row is a pixel row that constitutes a standard when calculating out of focus amount using the phase difference AF method, and the reference pixel row is a pixel row that causes a variation in range when calculating out of focus amount.

Also, with the example shown in FIG. 2, a virtual pixel A1 consists of row 1 to row 4 of the image sensor 21, which is the range enclosed by the broken line with reference numeral A1, while the virtual pixel B1 corresponds to a range enclosed by the solid line with reference numeral B1 consisting of row 1 to row 4. Similarly, virtual pixels A2-A9 ad B2-B9 are each formed of 4 rows. If a number of focus detection pixels 21a arranged in a direction perpendicular to the phase difference detection direction, in the specified region shown in FIG. 3A, is made a first number, the AF calculation section 23 calculates a first addition output in a direction perpendicular to the phase difference detection direction by adding outputs of the first number of focus detection pixels. Reading out of a pixel row at the time of ranging will be described later using FIG. 4.

FIG. 3B shows an arrangement of virtual pixels at the time of angle error detection. The example shown in FIG. 3B as a 2 line format, with each virtual pixel row A and B being divided into 2, to create upper virtual pixel rows Aα1-Aα9 and Bα1-Bα9, and lower virtual pixel rows Aβ1-Aβ9 and Bβ1-Bβ9. For each of the virtual pixels shown in FIG. 3B, a number of focus detection pixels 21a to be added is a second number that is fewer than the first number. The AF calculation section 23 calculates a plurality of second addition outputs for different positions in a direction perpendicular to the phase difference detection direction by adding outputs of the second number of focus detection pixels, and creates pixel values for the virtual pixels. A method of creating pixel values for virtual pixels at the time of two-line format angle error detection will be described later using FIG. 5.

FIG. 3C is an example of a three line format, showing arrangement of virtual pixels at the time of angle error detection. With this example, each virtual pixel row A and B is divided into 3, to create upper virtual pixel rows Aα1-Aα9 and Bα1-Bα9, middle virtual pixel rows Aβ1-Aβ9 and Bβ1-Bβ9 and lower virtual pixel rows Aγ1-Aγ9 and Bγ1-Bγ9. For each of the virtual pixels shown in FIG. 3C, a number of focus detection pixels 21a to be added is a second number that is fewer than the first number, and preferably ⅓ or less of the first number. The AF calculation section 23 calculates pixel values for the virtual pixels, being a plurality of second addition outputs for different positions in a direction perpendicular to the phase difference detection direction, by adding outputs of the second number of focus detection pixels. A method of creating pixel values for virtual pixels at the time of three-line format angle error detection will be described later using FIG. 6.

For equation (1) above, the subject angle θ (refer to FIG. 2) can be calculated from equation (2) below with the example of FIG. 6, which will be described later.

$$\text{subject angle } \theta = \arctan\{(\text{correlation operation result for } A\alpha \text{ and } A\beta \text{ and result of correlation of } A\beta \text{ and } A\gamma) \times (\text{spacing of } \alpha,\beta,\gamma \text{ pixel rows})/(AF \text{ pixel pitch})\} \quad (2)$$

Figure 6:
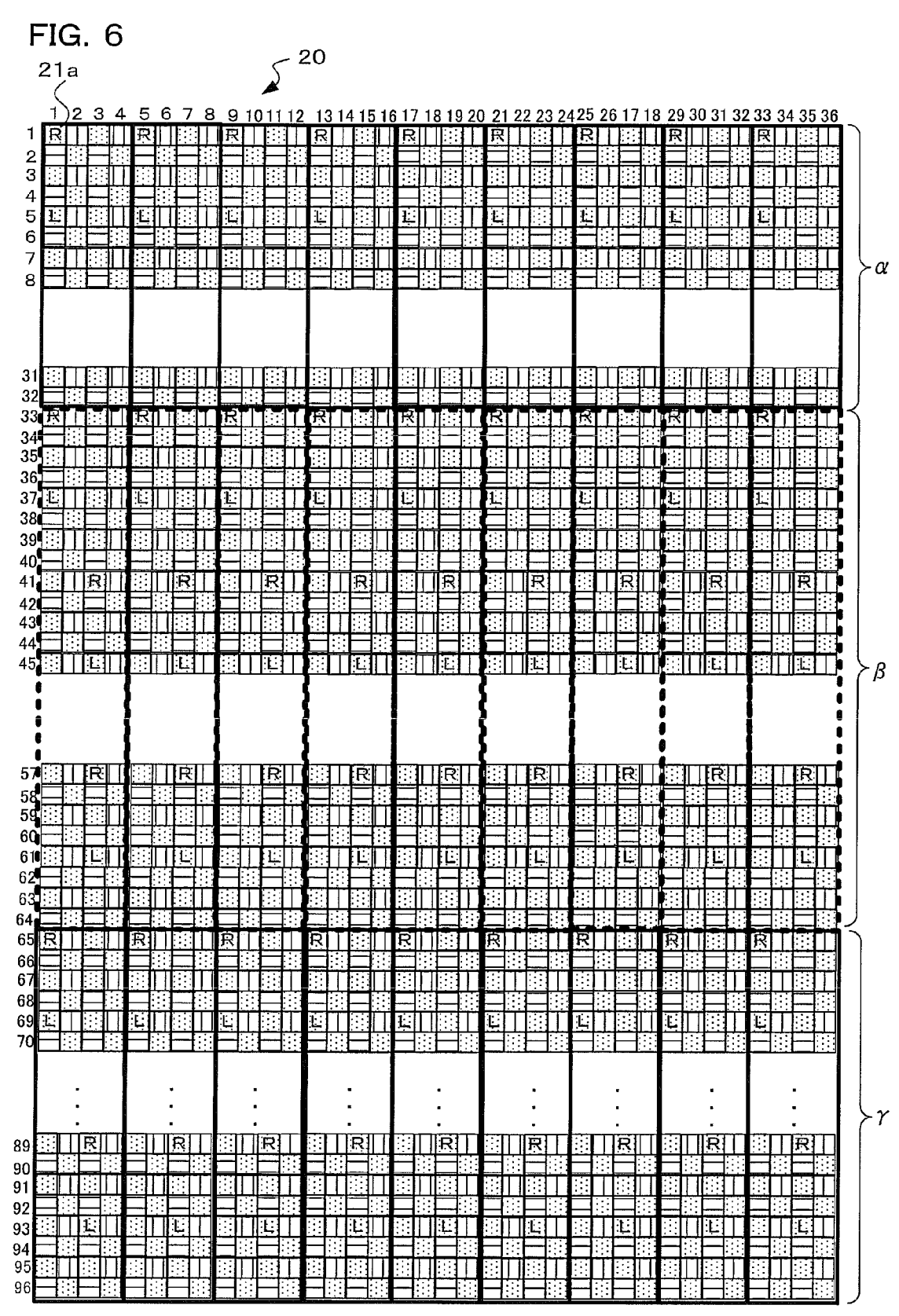

With the example shown in FIG. 6, (spacing of α, β, γ pixel rows)/AF pixel pitch)=16/4=4.

Figure 4:
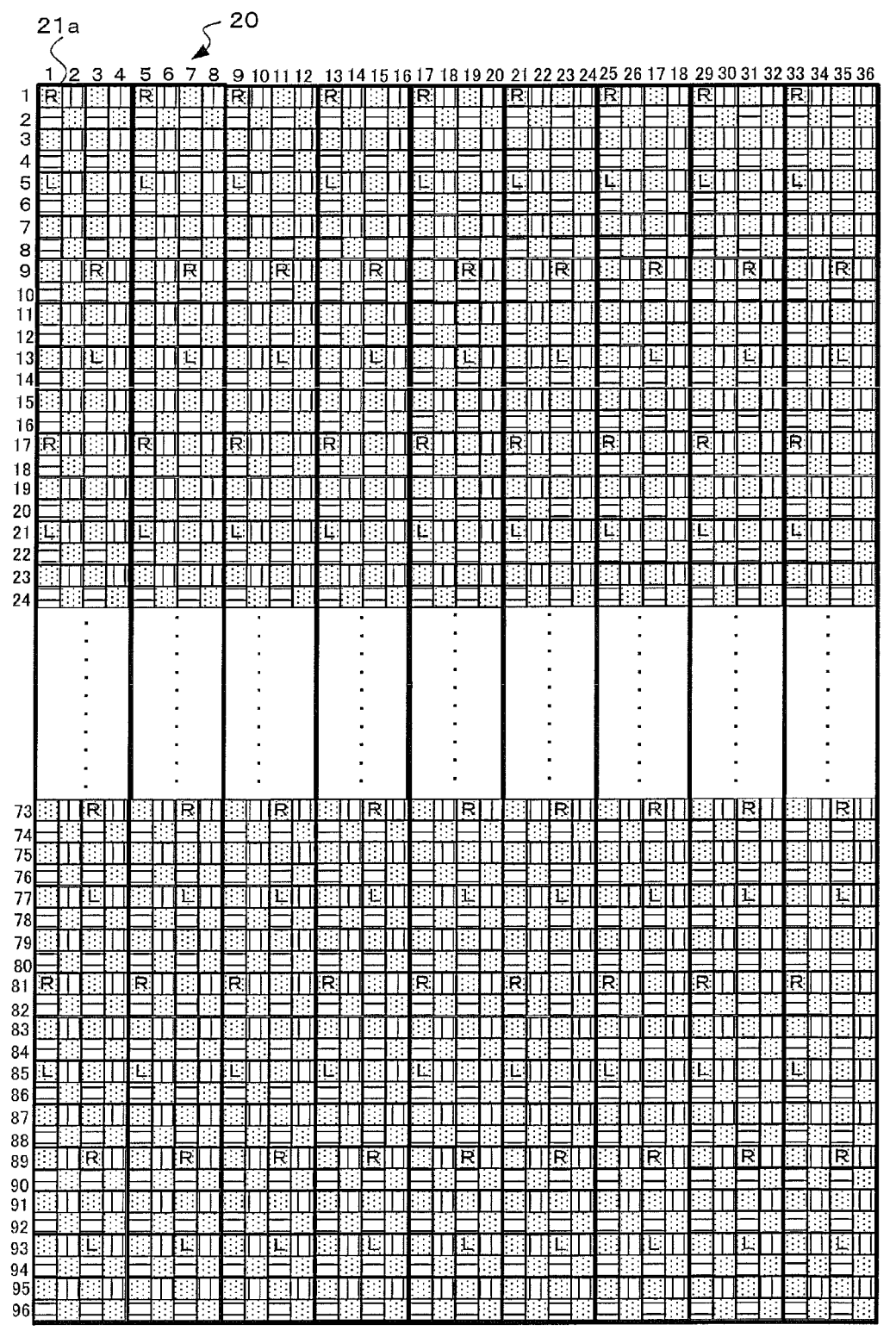

The pixel arrangement of the image sensor 21 shown in FIG. 4 is the same as the arrangement shown in FIG. 2, with a single virtual pixel being constructed of all pixel rows, and at the time of ranging (at the time of calculation of out of focus amount) respective addition values are calculated for 12 R pixels and 12 L pixels, for every virtual pixel, to create respective single L and R virtual pixels for AF. The AF calculation section 23 calculates out of focus direction and out of focus amount using virtual pixel values, which are addition values for each virtual pixel.

Figure 5:
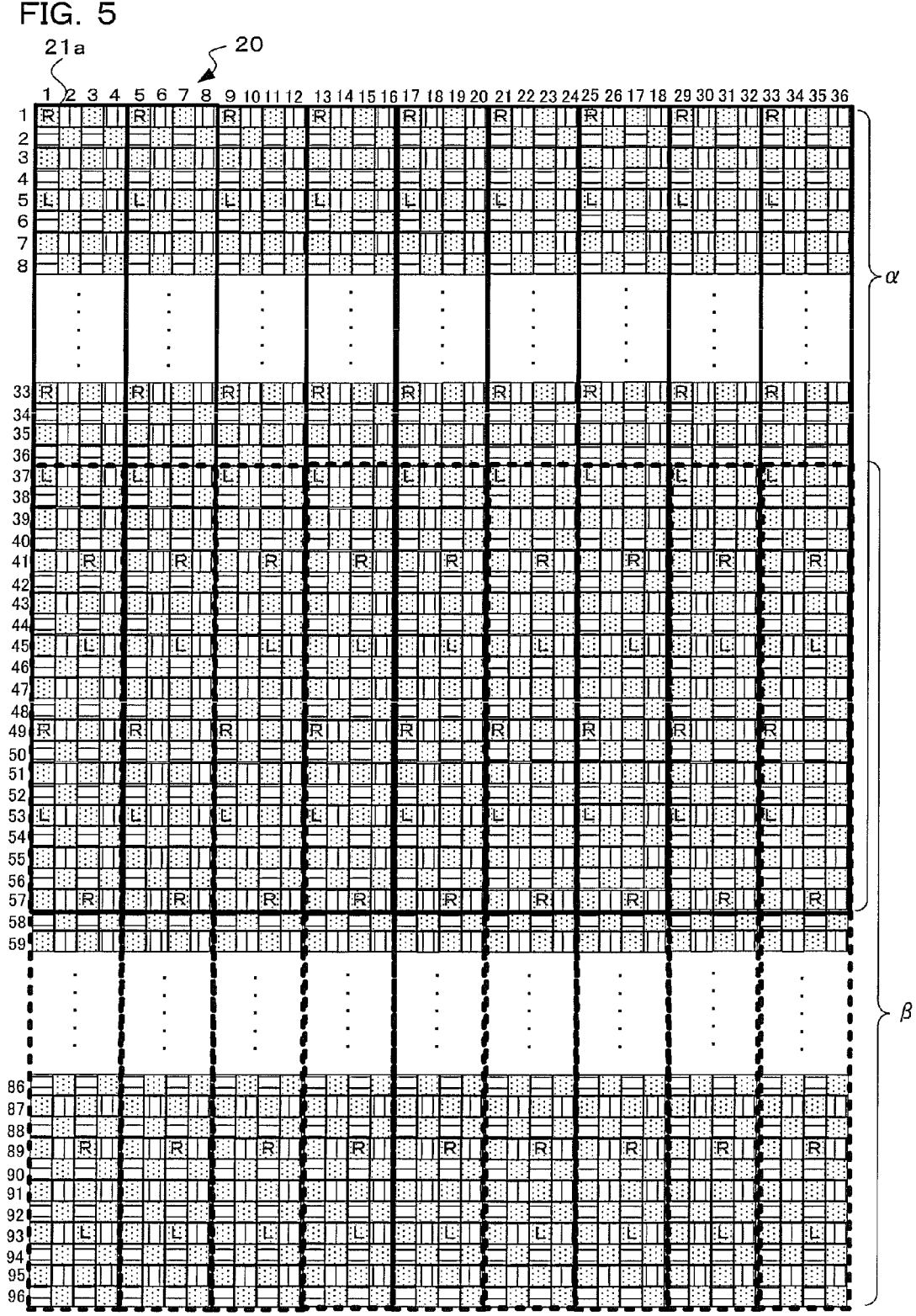
FIG. 5 is a plan diagram showing the structure of an image sensor of a camera of one embodiment of the present invention.

FIG. 5 shows a pixel addition method using a two line format carried out at the time of angle error detection using the image sensor 21. In FIG. 5, from the 1st line to the 57th line of each virtual pixel row is an upper range for a virtual pixel row, and corresponds to Aα1-Aα9 and Bα1-Bα9 in FIG. 3B. Also, from the 37th line to the 96th line of each virtual pixel row is a lower range for a virtual pixel row, and corresponds to Aβ1-Aβ9 and Bβ1-Bβ9 in FIG. 3B. In each virtual pixel row, from the 37th line to the 57th line are overlapped. With this example, at the time of angle error detection, 8 of the R pixels and L pixels are respectively added, to create respective single L and R virtual pixels for AF, corresponding to a segment of a virtual pixel row (single pixel). Then, AF pixel rows, which are a total of two virtual pixel rows (α, β), are created in a direction perpendicular to the phase difference detection direction (correlation operation direction).

FIG. 6 shows an addition method for pixels using a three line format at the time of angle error detection using the image sensor 21. In FIG. 6 from the 1st line to the 32nd line of each virtual pixel row is an upper range for a virtual pixel row, and corresponds to Aα1-Aα9 and Bα1-Bα9 in FIG. 3C. Also, from the 33rd line to the 64th line of each virtual pixel row is a middle range for a virtual pixel row, and corresponds to Aβ1-Aβ9 and Bβ1-Bβ9 in FIG. 3C. Also, from the 65th line to the 96th line of each virtual pixel row is a lower range for a virtual pixel row, and corresponds to Aγ1-Aγ9 and Bγ1-Bγ9 in FIG. 3C. With this example, in each virtual pixel row there are no overlapped locations, but some parts may overlap, as in the 2-line format. At the time of angle error detection, 4 of the R pixels and L pixels are respectively added, to create respective single L and R virtual pixels for AF, corresponding to a segment of a virtual pixel row (single pixel). Then, AF pixel rows, which are a total of three virtual pixel rows (α, β, γ), are created in a direction perpendicular to the phase difference detection direction (correlation operation direction).

In this way, the manner in which virtual pixel rows of a pixel addiction section are divided when carrying out angle error detection may be division so as to overlap, as shown in FIG. 5, or may be division so as not to overlap, as shown in FIG. 6. Also, compared to the first number of focus detection elements relating to virtual pixels at the time of ranging, a second number of focus detection elements relating to virtual pixels at the time of angle error detection may be smaller than the first number. The first number may also be divided into a plurality. This plural division is preferably three or more.

Next, a ranging operation of this embodiment will be described using the flowchart shown in FIG. 7. This flowchart is executed by the CPU (central Processor Unit) provided within the image processing section 22 causing the AF calculation section 23 etc. to operate in accordance with a program stored in the memory 27.

If the ranging operation is commenced, first an AF pixel subroutine is executed in order to create virtual pixels (S1). Here, the AF calculation section 23 acquires pixel values for R pixels and L pixels, along a direction perpendicular to the phase difference detection direction (also called the ranging direction, correlation operation direction), for focus detection pixels of the image sensor 21.

If AF pixel sampling has been carried out, next AF pixel data for ranging is created (S3). Here, as was described using FIG. 3A and FIG. 4, pixel values for each virtual pixel are created by carrying out addition respectively for R pixels and L pixels for every virtual pixel, to give AF pixel data for ranging.

If creation of AF pixel data for ranging has been carried out, next a correlation operation for ranging is carried out (S5). Here, out of focus direction and out of focus amount are calculated by a known phase difference AF method, using AF pixel data for ranging, being respective added values for R pixels and L pixels for every virtual pixel that was acquired in step S3.

Once the correlation operation for ranging has been carried out, it is next determined whether or not reliability is OK (S7). Here, determination is for reliability of the correlation operation that was implemented in step S5. As a determination method, determination is based on whether a local minimum value (minimum value) is smaller than a specified value, and whether a gradient close to a local minimum value (minimum value) is sufficiently large.

Figure 8A:
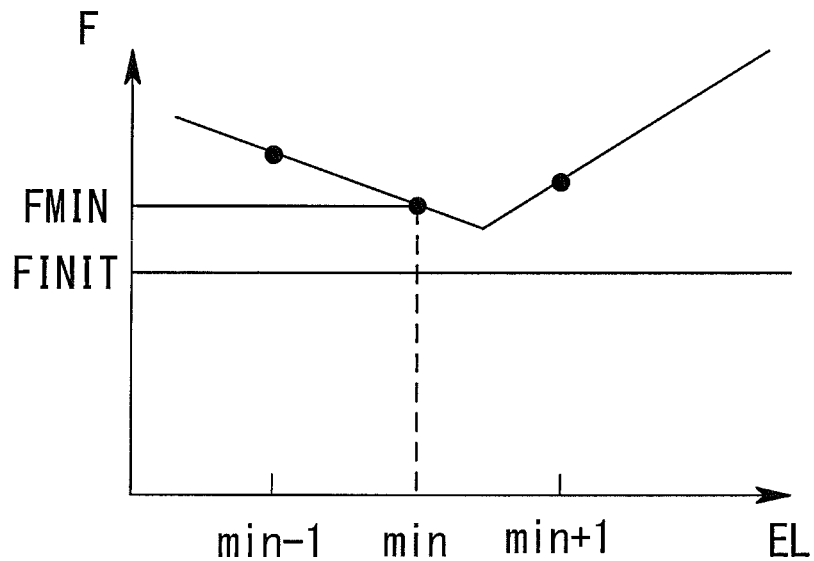
FIG. 8A and FIG. 8B are drawings for explaining determination of reliability of out of focus amount, in the camera of one embodiment of the present invention.

This determination of reliability in step S7 will be described using FIG. 8A and FIG. 8B. FIG. 8A is a graph showing position EL close to where an evaluation F becomes a minimum value, and evaluation value F. The position EL represents an amount of offset between a standard pixel and a reference pixel (phase difference), while evaluation value F represents a cumulative value of absolute value of the difference between the standard pixel and the reference pixel. On this graph, an evaluation value F where position EL, which is the amount of offset, is min constitutes a minimum value FMIN. The determination of reliability is made reliable in the case where the evaluation value FMIN is smaller than a determination value FINT.

Figure 8B:
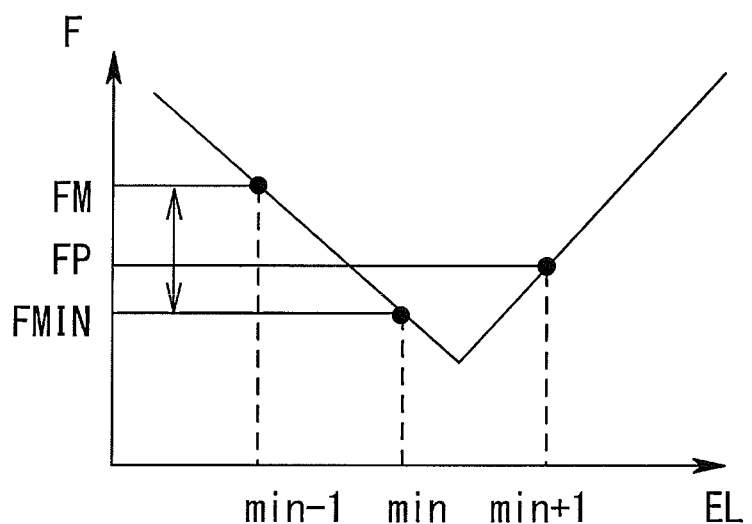

FIG. 8B is also a graph showing position EL close to where an evaluation value F approaches a minimum value, and evaluation value F, with evaluation value F being a minimum value FMIN where position EL is min, and evaluation value F being FM where position EL is min−1. Also, where position EL is min+1, evaluation value F is FP, giving a relationship of evaluation value FM>evaluation value FP. Reliability determination is judged to be reliable when, using an evaluation value FM, which is the largest value among evaluation values close to the minimum value FMIN, and the minimum value FMIN, an inclination FS of a straight line joining those two points is greater than or equal to a determination threshold FSmin. The reliability determination is not limited to the two methods described above, and other methods may also be used.

Returning to FIG. 7, if the result of determination in step S7 is reliable, then next AF pixel data for rotation angle detection is created (S9). Here, as was described for FIG. 3B and FIG. 3C, and for FIG. 5 and FIG. 6, addition values for AF pixel values are calculated for every $A\alpha$, $A\beta$, $A\gamma$, $B\alpha$, $B\beta$ and $B\gamma$ for each virtual pixel row, and AF pixel data for rotation angle detection is created. The flowchart shown in FIG. 7 shows operation in the case where a three-line format has been adopted. In the case of a two line format, steps S15-S19 may be omitted.

Once AF pixel data for rotation angle detection has been created, next $A\alpha$ and $A\beta$ correlation operations are carried out (S11). Here, the AF calculation section 23 carries out a correlation operation for an uppermost portion $\alpha$ and a portion $\beta$ second from the top of the virtual pixel row A and the virtual pixel row B shown in FIG. 3C, using the AF pixel data that was created for every $A\alpha$, $A\beta$, $B\alpha$ and $B\beta$ of each virtual pixel row in step S9, to obtain an upper angle error amount.

Once the correlation operation for rotation angle detection using $A\alpha$ and $A\beta$ has been carried out in step S11, it is determined whether or not reliability is OK (S13). Here, reliability of the correlation operation in step S11 is determined by the same method as in step S7.

If the result of determination in step S13 is reliable, $A\beta$ and $A\gamma$ correlation operations are carried out (S15). Here, the AF calculation section 23 carries out a correlation operation for a portion $\beta$ second from the top and a lowermost portion $\gamma$ of the virtual pixel row A and the virtual pixel row B shown in FIG. 3C, using the AF pixel data that was created for every $A\beta$, $A\gamma$, $B\beta$ and $B\gamma$ of each virtual pixel row in step S9, to obtain a lower angle error amount. Then, an average value for upper angle error amount and lower angle error amount is calculated as an angle error correction amount.

Once the correlation operation for rotation angle detection using $A\beta$ and $A\gamma$ has been carried out in step S15, it is determined whether or not reliability is OK (S17). Here, the AF calculation section 23 determines reliability of the correlation operation in step S15 by the same method as in step S7.

If the result of determination in step S17 is reliable, it is determined whether or not the upper and lower angle error amounts are similar (S19). Determination as to whether or not the upper and lower angle error amounts are similar is carried out in accordance with the following conditions, and it is determined that the upper and lower angle error amounts are similar if both conditions (a) and (b) are satisfied.

(a) sign of ($A\alpha$ and $A\beta$ angle error amount (upper angle error amount))=sign of ($A\beta$ and $A\gamma$ angle error amount (lower angle error amount))

and (b) [{absolute value of ($A\alpha$ and $A\beta$ angle error amount (upper angle error amount))}−{absolute value of ($A\beta$ and $A\gamma$ angle error amount (lower angle error amount))}]×100/[{absolute value of ($A\alpha$ and $A\beta$ angle error correction amount (upper angle error amount))}+{absolute value of ($A\beta$ and $A\gamma$ angle error amount (lower angle error amount))}] 30%.

Figure 3:
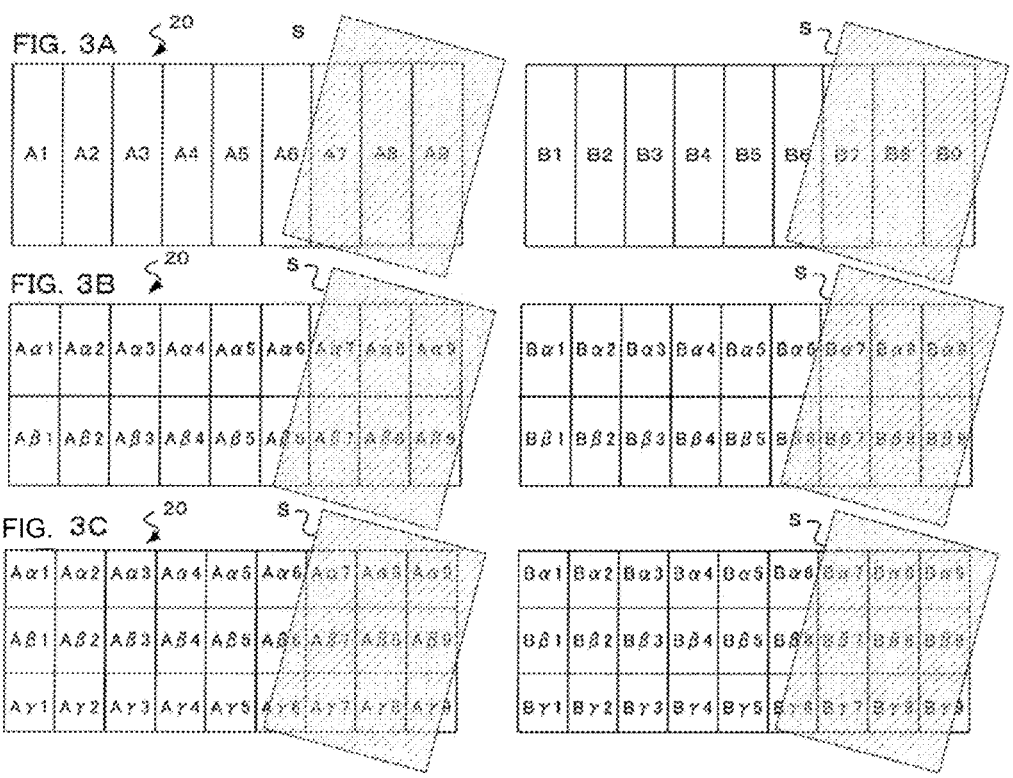
FIG. 3A-FIG. 3C are drawings for explaining the concept of focus detection, in the camera of one embodiment of the present invention.

In the event that an offset amount for the correlation operation for $A\alpha$ and $A\beta$ (upper angle error amount), and an offset amount for the correlation operation for $A\beta$ and $A\gamma$ (lower angle error amount) carried out in steps S11 and S15 are substantially the same, the probability of an inclined subject S as shown in FIG. 2 and FIG. 3, or a subject perpendicular to the phase difference detection direction, is high.

If the result of decision in step S19 is that the upper and lower angle error amounts are similar, angle error correction is carried out (S21). Here, the AF calculation section 23 subtracts the angle error correction amount that was calculated using the above described equation (1) from the out of focus amount that was calculated in step S5. In the case where there is not an inclined subject also, correction is carried out in this step, but since the correction amount is 0 it is substantially equal to the out of focus amount calculated in step S5. In the event that the upper and lower angle error amounts are not similar, there is not a rotated (inclined) subject. That is, it is determined to be a subject for which correction of angle error is not required, and angle error correction is not carried out.

If angle error correction has been carried out in step S21, focus drive is next carried out (S23). Here, the AF calculation section 23 outputs the out of focus amount and out of focus direction that were calculated in step S5 and corrected in step S21 to the lens control section 13, and focus drive of the photographing lens 11 is carried out by the actuator 12.

Once focus drive has been carried out in step S23, or if the result of determination in steps S7 or S13 was not that reliability was OK, or if the result of determination in step S19 was that the upper and lower angle error amounts were not similar, the flow for the ranging operation is terminated.

In this way, in the flow for the ranging operation, a focus detection operation is executed based on an addition output (first addition output) of focus detection pixels 21a along the direction perpendicular to the phase difference detection direction as shown in FIG. 3A (S3, S5), whether or not to correct angle error is determined based on addition output (second addition output) of a plurality of pixels, of the focus detection pixels 21a, that are fewer than for the first addition output, as shown in FIG. 3B and FIG. 3C (S19), and if it is determined to correct the angle error, the angle error is corrected for the result of the focus detection operation (S21).

Also, in the flow for the ranging operation, calculation of angle error correction amount is carried out by calculating a degree of correlation between a plurality of second addition outputs for a direction perpendicular to the phase difference detection direction (S11-S21). Further, a plurality of degrees of correlation are calculated in accordance with a plurality of combinations that are different to the plurality of second addition outputs (S11 and S15), and if the plurality of degrees of correlation satisfy specified conditions it is determined to correct angle error (S19).

Next, pixel rows for correlation operations at the time of angle error detection will be described using FIG. 9A, FIG. 9B and FIG. 10. FIG. 9A shows virtual pixel rows formed from focus detection pixel rows of the image sensor 21, and in the drawing the numbers on the top represent numbers for arrangement order of virtual pixel rows. In FIG. 9A, row 21-row 80 signifies a pixel range of standard section pixel rows of the virtual pixel rows showing a minimum correlation value in a correlation operation at the time of ranging.

In order to make a pixel row range for a correlation operation at the time of ranging (refer to S5 in FIG. 7) match a pixel row range for a correlation operation at the time of angle error detection (refer to S11 in FIG. 7), setting is performed as described below. In the case of performing a correlation operation with virtual pixel rows Aα and Aβ, pixel rows that are the subject of a correlation operation for Aα are made the same range as correlation operation pixel rows for which a minimum value of correlation value was obtained at the time of ranging. A correlation operation is then carried out by sequentially shifting the range of pixel rows that are the subject of correlation operations for virtual pixel rows Aβ. By making the range of correlation operation pixel rows at the time of ranging match the range of correlation operation pixel rows at the time of angle error detection, it becomes possible to appropriately calculate an angle error amount, even if there are different subjects outside the field of view.

For example, as shown in FIG. 9B, subjects S1 (house) and S2 (a face) of differing distances exist within distance points, and if they are projected onto virtual pixel rows Aα, a minimum value of correlation value is obtained on correlation operation pixel rows (row 21-row 80) (assigned a dotted pattern in the drawing)) at the time of ranging. In other words, ranging will be executed with the subject S2 (face) as a main subject. Even though, in the case where a correlation operation is carried out using correlation operation pixel rows (row 0 to row 60) of virtual pixel rows Aα at the time of angle error detection, a minimum value of correlation value between an image of the subject S1 (house) projected onto the virtual pixel rows Aα and an image of subject S2 (face) projected onto virtual pixel rows Aβ is detected, and an angle error amount will be erroneously detected. As a result, angle error correction will be performed erroneously, even if a subject does not actually require angle error correction.

FIG. 10A is a correlation operation block diagram for pixel row Aα. For example, among row 0-row 99 of the pixel row Aα, a 59 row portion from row 21 to row 80 (assigned a dotted pattern in the drawing) shows position of a standard image at the time of the correlation operation. Also, FIG. 10B is a correlation block diagram for pixel row Aβ. With 59 row segments from among row 0-row 99 of pixel row Aβ as reference images, correlation operations are sequentially carried out with a standard image of row Aα (refer to FIG. 10A).

In this way, with this embodiment, when performing correlation operations at the time of angle error detection in steps S11 and S15, a range of pixel rows showing a minimum correlation value, namely an extremely high degree of correlation, in correlation operations at the time of ranging is made the same range as for correlation operations at the time of angle error detection. It is therefore possible to appropriately calculate an angle error amount, even if there are different subjects outside the field of view.

As has been described above, in the one embodiment of the present invention, in so-called image plane phase difference AF, at the time of normal ranging and at the time of angle error detection, virtual pixel rows for different correlation operations are created as AF pixel rows within a single virtual pixel (a single area made up of a plurality of pixel rows) (refer to FIG. 2-FIG. 6). As different virtual image rows, at the time of normal ranging, a single virtual pixel is created by performing n pixel addition of focus detection pixels in a direction that is different to the phase difference detection direction. On the other hand, at the time of angle error correction, the number of pixel additions of the focus detection pixels within the single virtual pixel is set to less than n, and two or more virtual pixel rows made up of virtual pixels that have been created by adding a number of pixel additions that is less than n are created. Then, correlation operations are carried out on the two virtual pixel rows for a direction that is different to the phase difference detection direction, to detect angle error.

With phase difference AF of a conventional imaging device, namely phase difference AF for an imaging device that is provided with an image sensor that has a part thereof that also functions as focus detection elements for a phase difference method, pixels of focus detection elements in a direction that is perpendicular to the phase difference detection operation are added, and an out of focus amount is calculated using this added pixel data, which means that if there is a subject 105 having edge portions that are inclined with respect to the phase difference detection direction (refer to FIG. 11), there is a possibility of erroneous ranging. In order to solve this problem, as described previously in Japanese patent laid-open number 2000-206403, it was considered to provide a third sensor 101a, but even with an inclined subject, the subject is taken as being orthogonal with respect to the phase difference detection direction, a rotation angle is wrongly calculated, and erroneous ranging cannot be resolved. Conversely, with the one embodiment of the present invention, since different pixel rows are used at the time of normal ranging and at the time of angle error detection, it is possible to accurately perform ranging even for an inclined subject.

Also, with the one embodiment of the present invention, at the time of normal ranging, focus detection pixels are subjected to n pixel addition in a direction that is different to the phase difference detection operation per single area corresponding to a virtual pixel, but at the time of angle error detection, the number of pixel additions within a single area corresponding to a virtual pixel is set to n/3. At the time of angle error detection, three or more virtual pixel rows are created for a single ranging area, correlation operations are carried out for a first virtual pixel row at the top of the ranging area and for a second virtual pixel row, and an angle error amount is calculated for an upper portion (S11). Further, correlation operations are carried out for the second virtual pixel row and a third virtual pixel row that is positioned at the bottom of the ranging area, to calculate an angle error amount for a lower portion (S15). Then, if the angle error amount for the upper portion of the angle error for the lower portion satisfy specified conditions, correction of the angle error is carried out (S21). As the specified conditions there may be "is it possible to detect angle error amounts in both the upper portion and the lower portion?", and whether or not the angle error amounts for the upper portion on the lower portion have the same sign.

Also, with the one embodiment of the present invention, at the time of a correlation operation for angle error detection, a standard image portion adopts a position and range of correlation operation pixel rows where correlation value resulting from correlation operations at the time of ranging is minimum, namely where a degree of correlation is maximum.

With the one embodiment of the present invention, pixel values have been created for virtual pixels by adding focus detection pixels for every area that is constituted by four pixel rows of the image sensor 21. However, the number of pixel rows of the image sensor 21 that are included in a single area corresponding to a virtual pixel is not thus limited, and may be a single pixel or plurality of pixels. Also, with the one embodiment of the present invention, at the time of angle error detection one virtual pixel row for at the time of ranging is divided into two or three virtual pixel rows, but this ranging virtual pixel may also be divided into four or more virtual pixel rows.

Further, with the one embodiment of the present invention, a device for taking pictures has been described using a digital camera, but as a camera it is also possible to use a digital single lens reflex camera, a mirrorless camera or a compact digital camera, or a camera for movie use such as a video camera, and further to have a camera that is incorporated into a mobile phone, a smartphone, a mobile information terminal (PDA: Personal Digital Assistant), game console etc. In any event, it is possible to adopt the present invention as long as a device carries out a phase difference method focus detection on an image plane.

Also, regarding the operation flow in the patent claims, the specification and the drawings, for the sake of convenience description has been given using words representing sequence, such as "first" and "next", but at places where it is not particularly described, this does not mean that implementation must be in this order.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An imaging device, having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprising:
a focus detection section for detecting an out of focus amount and an out of focus direction by carrying out a focus detection operation using phase difference detection based on output of the focus detection pixels;
a pixel adding section, for creating respective first addition outputs by adding outputs of a first number of focus detection pixels that are arranged in a direction that is perpendicular to a detection direction for the phase difference detection, for a plurality of regions arranged in the detection direction for phase difference detection of an imaging region of the image sensor, and creating respective second addition outputs in a direction that is perpendicular to the phase difference detection direction by adding outputs of a second number of focus detection pixels that is smaller than the first number, arranged in a direction perpendicular to the phase difference detection direction, for a plurality of regions arranged in the detection direction for phase difference detection; and
a determination section for determining whether or not to correct an angle error arising as a result of inclination of an optical image with respect to the pixel array direction, wherein
the focus detection section executes a focus detection operation on the basis of the first addition outputs corresponding to the plurality of regions,
the determination section determines whether or not to correct angle error on the basis of the plurality of second addition outputs corresponding to the plurality of regions, and
in the event that the determination section has determined to correct angle error, the focus detection section corrects angle error based on a result of a focus detection operation.

2. The imaging device of claim 1, wherein
the second number is ⅓ or less of the first number.

3. The imaging device of claim 1, wherein
the focus detection section calculates a correction amount for the angle error and performs correction by calculating a degree of correlation between a plurality of second addition outputs for a direction perpendicular to the phase difference detection direction.

4. The imaging device of claim 3, wherein:
the focus detection section calculates a plurality of degrees of correlation in accordance with a plurality of different combinations of the plurality of second addition outputs, and
the determination section determines to correct angle error if the plurality of degrees of correlation satisfy specified conditions.

5. An imaging device, having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprising:
a focus detection section for detecting an out of focus amount and an out of focus direction by carrying out a focus detection operation using phase difference detection based on output of the focus detection pixels;
a pixel adding section, for creating respective first addition outputs by adding outputs of a first number of focus detection pixels that are arranged in a direction that is perpendicular to a detection direction for the phase difference detection, for a plurality of regions arranged in the phase difference detection direction of an imaging region of the image sensor, and creating respective second addition outputs in a direction that is perpendicular to the phase difference detection direction by dividing the first number of arrays, that are arrayed in a direction perpendicular to the phase difference detection direction, into a plurality, and adding outputs of focus detection pixels of the divided array, for a plurality of regions arranged in the detection direction for phase difference detection; and
a determination section for determining whether or not to correct an angle error arising as a result of inclination of an optical image with respect to the pixel array direction, wherein
the focus detection section executes a focus detection operation on the basis of the first addition outputs corresponding to the plurality of regions,
the determination section determines whether or not to correct angle error on the basis of the plurality of second addition outputs corresponding to the plurality of regions, and
in the event that the determination section has determined to correct angle error, the focus detection section corrects angle error based on a result of a focus detection operation.

6. The imaging device of claim 5, wherein:
the division of the pixel adding section is preferably three or more.

7. The imaging device of claim 5, wherein:
the focus detection section calculates a correction amount for the angle error and performs correction by calculating a degree of correlation between a plurality of second addition outputs for a direction perpendicular to the phase difference detection direction.

8. The imaging device of claim 7, wherein:
the focus detection section calculates a plurality of degrees of correlation in accordance with a plurality of different combinations of the plurality of second addition outputs, and
the determination section determines to correct angle error if the plurality of degrees of correlation satisfy specified conditions.

9. A focus detection method, for controlling a focus detection operation of an imaging device having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprising:
detecting an out of focus amount and an out of focus direction by carrying out a focus detection operation using phase difference detection based on output of the focus detection pixels;
creating respective first addition outputs by adding outputs of a first number of focus detection pixels that are arranged in a direction that is perpendicular to a detection direction for the phase difference detection, for a plurality of regions arranged in the detection phase difference detection direction of an imaging region of the image sensor;
creating respective second addition outputs in a direction that is perpendicular to the phase difference detection direction by adding outputs of a second number of focus detection pixels that is smaller than the first number, arranged in a direction perpendicular to the phase difference detection direction, for a plurality of regions arranged in the detection direction for phase difference detection;
executing a focus detection operation on the basis of the first addition outputs corresponding to the plurality of regions; and
determining whether or not to correct angle error, arising as a result of inclination of an optical image with respect to the pixel array direction, on the basis of the plurality of second addition outputs corresponding to the plurality of regions, and, in the event that it is determined to correct angle error, correcting angle error for a result of the focus detection operation.

10. The focus detection method of claim 9, wherein:
the second number is $\frac{1}{3}$ or less of the first number.

11. The focus detection method of claim 9, wherein: a correction amount for the angle error is calculated, and angle error corrected, by calculating a degree of correlation between a plurality of second addition outputs for a direction perpendicular to the phase difference detection direction.

12. The focus detection method of claim 11, wherein:
a plurality of degrees of correlation are calculated in accordance with a plurality of different combinations of the plurality of second addition outputs, and
if the plurality of degrees of correlation satisfy predetermined conditions, it is determined to correct angle error.

13. A focus detection method, for an imaging device having an image sensor that is provided with a plurality of pixels having photoelectric conversion sections for converting an optical image that has been formed by an imaging optical system into electrical signals, including focus detection pixels, formed so as to restrict an incident direction of light flux that is incident on the pixels, and imaging pixels, formed so as not to restrict light flux incident on the pixels as much as the focus detection pixels, the plurality of pixels being arrayed two-dimensionally, comprising:
- detecting an out of focus amount and an out of focus direction by carrying out a focus detection operation using phase difference detection based on output of the focus detection pixels;
- creating respective first addition outputs by adding outputs of a first number of focus detection pixels that are arranged in a direction that is perpendicular to the phase difference detection direction, for a plurality of regions arranged in the detection phase difference detection direction an imaging region of the image sensor;
- creating respective second addition outputs in a direction that is perpendicular to the phase difference detection direction by dividing the first number of arrays, that are arrayed in a direction perpendicular to the phase difference detection direction, into a plurality, and adding outputs of focus detection pixels of the divided array for a plurality of regions arranged in the detection phase difference detection direction
- executing a focus detection operation on the basis of the first addition outputs corresponding to the plurality of regions; and
- determining whether or not to correct angle error, arising as a result of inclination of an optical image with respect to the pixel array direction, on the basis of the plurality of second addition outputs corresponding to the plurality of regions, and, in the event that it is determined to correct angle error, correcting angle error for a result of the focus detection operation.

14. The focus detection method of claim 13, wherein:
the division of the pixel adding section is preferably three or more.

15. The focus detection method of claim 13, wherein:
a correction amount for the angle error is calculated, and angle error corrected, by calculating a degree of correlation between a plurality of second addition outputs for a direction perpendicular to the phase difference detection direction.

16. The focus adjustment method of claim 15, wherein
a plurality of degrees of correlation are calculated in accordance with a plurality of different combinations of the plurality of second addition outputs, and
if the plurality of degrees of correlation satisfy predetermined conditions, it is determined to correct angle error.

* * * * *